(12) United States Patent
Cho et al.

(10) Patent No.: US 12,157,350 B2
(45) Date of Patent: Dec. 3, 2024

(54) AUTOMOTIVE GLASS SETTING APPARATUS AND METHOD THEREOF

(71) Applicants: HYUNDAI MOTOR COMPANY, Seoul (KR); KIA CORPORATION, Seoul (KR)

(72) Inventors: Yong Soo Cho, Gunpo-si (KR); Jung Whan Yeum, Seoul (KR); Je Uk Shin, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 426 days.

(21) Appl. No.: 17/519,198

(22) Filed: Nov. 4, 2021

(65) Prior Publication Data
US 2022/0402338 A1    Dec. 22, 2022

(30) Foreign Application Priority Data

Jun. 22, 2021    (KR) .................. 10-2021-0081150

(51) Int. Cl.
*B25J 9/16* (2006.01)
*B25J 13/08* (2006.01)
(Continued)

(52) U.S. Cl.
CPC ............. *B60J 1/005* (2013.01); *B25J 9/1687* (2013.01); *B25J 9/1694* (2013.01); *B25J 13/084* (2013.01); *B25J 15/0616* (2013.01)

(58) Field of Classification Search
CPC ....... B60J 1/005; B60J 1/10; B60J 1/00; B60J 1/004; B60J 1/20; B25J 9/1687;
(Continued)

(56) References Cited

U.S. PATENT DOCUMENTS 4,909,869 A * 3/1990 Sakamoto ............. B62D 65/06
156/364
6,230,077 B1 * 5/2001 Choi ....................... B62D 65/06
29/469

(Continued)

FOREIGN PATENT DOCUMENTS

JP    2015-045582 A     3/2015
KR    100828694 B1 *   5/2008    .......... B25J 15/0052
(Continued)

OTHER PUBLICATIONS

English machine translation of KR-100828694-B1 (Year: 2008).*

*Primary Examiner* — Sarang Afzali
*Assistant Examiner* — Darrell C Ford
(74) *Attorney, Agent, or Firm* — MCDONNELL BOEHNEN HULBERT & BERGHOFF LLP

(57) ABSTRACT

Provided is an automotive glass setting apparatus. The apparatus includes a setting base supporting a glass having a plurality of edges, and a plurality of alignment units allowing the glass to be aligned with the setting base. The apparatus further includes a scanning unit scanning the edges of the glass, and a plurality of moving mechanisms moving the plurality of alignment units. Additionally, the apparatus includes a controller controlling the moving mechanisms based on data scanned by the scanning unit to align a center of the glass with a center of the setting base.

15 Claims, 13 Drawing Sheets

(51) Int. Cl.
*B25J 15/06* (2006.01)
*B60J 1/00* (2006.01)

(58) Field of Classification Search
CPC .... B25J 9/1694; B25J 13/084; B25J 15/0616; G05B 2219/40033; B62D 65/022; B62D 65/06; B62D 65/024; B62D 65/028; B62D 65/026; B25B 11/02; B60Y 2304/07; Y10T 29/53974; Y10T 29/53978; Y10T 29/53991; B60S 9/22
USPC .................................................. 29/707, 709
See application file for complete search history.

(56) References Cited

U.S. PATENT DOCUMENTS

| | | |
|---|---|---|
| 10,056,283 B2 | 8/2018 | Park et al. |
| 10,914,758 B2 | 2/2021 | Yamazaki et al. |
| 2016/0356597 A1 | 12/2016 | Park et al. |
| 2017/0355408 A1* | 12/2017 | Levy ........................ B60J 1/005 |
| 2019/0271722 A1 | 9/2019 | Yamazaki et al. |
| 2020/0025800 A1 | 1/2020 | Shuto |

FOREIGN PATENT DOCUMENTS

| | | |
|---|---|---|
| KR | 10-1741217 B1 | 5/2017 |
| KR | 2019-0035705 A | 4/2019 |
| KR | 10-2155994 B1 | 9/2020 |
| KR | 10-2186362 B1 | 12/2020 |

\* cited by examiner

AUTOMOTIVE GLASS SETTING APPARATUS AND METHOD THEREOF

CROSS REFERENCE TO RELATED APPLICATIONS

This application is based on and claims the benefit of priority to Korean Patent Application No. 10-2021-0081150, filed on Jun. 22, 2021, in the Korean Intellectual Property Office, the disclosure of which is incorporated herein in its entirety by reference.

TECHNICAL FIELD

The present disclosure relates to an automotive glass setting apparatus and a method thereof, and more particularly, to an automotive glass setting apparatus accurately setting a vehicle glass to be mounted on a vehicle body in a setting base in a vehicle assembly line.

BACKGROUND

An automotive glass mounting system is designed to mount a vehicle glass in an opening of a vehicle body in a vehicle assembly line. The vehicle glass includes windshield, windscreen, and side and rear windows.

In the automotive glass mounting system, the vehicle glass may be preliminarily set in a setting base, and be mounted in the opening of the vehicle body transferred close to the setting base by a robot. Specifically, the vehicle glass may be set to be aligned with the setting base by an alignment mechanism, and the robot may include a gripper for gripping the vehicle glass and a vision camera mounted on the gripper. The gripper may grip the vehicle glass which has been set in the setting base, and the vision camera may check a mounting position of the vehicle glass. The robot may correct the mounting position based on data about the mounting position which has been received from the vision camera, and mount the vehicle glass in the opening of the vehicle body.

The alignment mechanism may allow the center of the vehicle glass to be aligned with the center of the setting base. The vehicle glass may be accurately positioned on the setting base by the alignment mechanism, and the gripper of the robot may grip the accurately positioned vehicle glass.

An alignment mechanism according to the related art includes a plurality of alignment members disposed on edges of the setting base, and a plurality of air cylinders configured to move the alignment members, respectively. Each alignment member may contact an edge of the vehicle glass, and each air cylinder may move the corresponding alignment member so that the plurality of alignment members may finely adjust and move the position of the vehicle glass in a horizontal direction and/or a vertical direction. Accordingly, the center of the vehicle glass may be aligned with the center of the setting base so that the vehicle glass may be set in a correct position on the setting base, and then the gripper of the robot may grip the set vehicle glass.

In the related art alignment mechanism, however, alignment members move in a state of contacting the vehicle glass, which may fail to allow the vehicle glass to be accurately aligned with the setting base if dimensional variations of the vehicle glass occur.

In addition, as the alignment members in the related art alignment mechanism repeatedly contact the edges of the vehicle glass, friction may cause severe wear of the alignment members. As a result, the plurality of alignment members may fail to allow the center of the vehicle glass to be accurately aligned with the center of the setting base.

In the related art alignment mechanism, the positioning of the vehicle glass on the setting base may not be accurate due to various factors such as defects of the vehicle glass itself and defects of the alignment mechanism. Accordingly, the gripper of the robot may grip the inaccurately positioned vehicle glass, so the mounting of the vehicle glass may not be accurately performed.

The above information described in this background section is provided to assist in understanding the background of the inventive concept, and may include any technical concept which is not considered as the prior art that is already known to those skilled in the art.

SUMMARY

The present disclosure has been made to solve the above-mentioned problems occurring in the prior art while advantages achieved by the prior art are maintained intact.

An aspect of the present disclosure provides an automotive glass setting apparatus and a method thereof capable of accurately positioning a vehicle glass to be mounted on a vehicle body in a setting base in a vehicle assembly line.

According to an aspect of the present disclosure, an automotive glass setting apparatus may include a setting base supporting a glass having a plurality of edges, a plurality of alignment units allowing the glass to be aligned with the setting base; a scanning unit scanning the edges of the glass, a plurality of moving mechanisms moving the plurality of alignment units, respectively, and a controller controlling the moving mechanisms based on data scanned by the scanning unit so as to allow a center of the glass to be aligned with a center of the setting base.

The movement of the alignment units may be adjusted by the moving mechanisms based on the data scanned by the scanning unit so that the center of the glass may be aligned with the center of the setting base, and thus the glass may be accurately positioned on the setting base. Since the glass is accurately positioned on the setting base, a gripper of a robot may accurately grip the glass, and thus the robot may accurately mount the glass in an opening of a vehicle body.

Each alignment unit may be movably mounted on each edge of the setting base by a corresponding moving mechanism. As each alignment unit contacts and presses each edge of the glass supported by the setting base, the alignment unit may move the glass with respect to the setting base.

As the plurality of alignment units contact and press the edges of the glass, respectively, the plurality of alignment units may move the glass relative to the setting base, and thus the center of the glass may be accurately aligned with the center of the setting base.

Each alignment unit may include a housing, and an alignment rod moving with respect to the housing. As a fluid is supplied and returned to the housing, the alignment rod may move between an extended position in which the alignment rod protrudes from the housing and a retracted position in which the alignment rod is received in the housing.

The alignment rod may move vertically in the housing. In particular, when the alignment rod is in the extended position, the alignment rod may contact and press the edge of the glass to align the glass, and when the alignment rod is in the retracted position, the alignment rod may not contact the edge of the glass. The alignment rod may contact the edge of the glass only during the alignment of the glass, so that the number of contacts between the alignment rod and the glass may be minimized, and thus wear of the alignment rod may be minimized.

The scanning unit may include a plurality of touch probes scanning the edges of the glass, respectively, and a scan processor processing data scanned by the plurality of touch probes. The touch probes may be moved along the edges of the glass by the moving mechanisms, respectively, so that the plurality of touch probes may scan the edges of the glass, respectively.

As the plurality of touch probes scan the respective edges of the glass, the scanning unit may precisely acquire the scanned data such as the outline, size, shape, and the like of the glass, and the controller may control the plurality of moving mechanisms based on the scanned data so that the plurality of alignment units may allow the glass to be accurately positioned on the setting base. In particular, even when a dimensional variation of the glass occurs, the controller may control the plurality of moving mechanisms based on the scanned data, thereby allowing the center of the glass to be accurately aligned with the center of the setting base.

Each touch probe may include a probe base, and a probe pin movably connected to the probe base. Specifically, the probe pin may be connected to the probe base through a ball joint.

As the probe pin pivots or rotates on the probe base, the probe pin may tightly contact the curved edge of the glass, thereby precisely scanning the edge of the glass.

Each touch probe and a corresponding alignment unit may be attached side by side to a corresponding moving mechanism so that the touch probe and the corresponding alignment unit may be moved together by the corresponding moving mechanism.

Each moving mechanism may move the corresponding alignment unit so that the alignment unit may allow the glass to be aligned with the setting base. Each moving mechanism may include an attachment, a first electric actuator causing the attachment to move along a first axis, and a second electric actuator causing the attachment to move along a second axis. The first axis may extend toward the center of the setting base, and the second axis may extend along an edge of the setting base.

As the attachment moves along the first axis, the alignment unit may move toward the center of the setting base or move away from the center of the setting base. As the attachment moves along the second axis, the touch probe may move along the edge of the setting base.

The first electric actuator may include a first electric motor, a first slider moving along the first axis by the first electric motor, and a first guide guiding a movement of the first slider. The second electric actuator may include a second electric motor, a second slider moving along the second axis by the second electric motor, and a second guide guiding a movement of the second slider. The second guide of the second electric actuator may be fixed to the first slider of the first electric actuator, and the attachment may be fixed to the second electric actuator.

As the first electric motor of the first electric actuator operates, the first slider may move along the first axis. The second electric actuator connected to the first slider and the attachment may move along the first axis, and the alignment unit may move the edge of the glass toward the center of the setting base or away from the center of the setting base.

The first electric actuator may include a first torque sensing control system sensing and controlling a torque of the first electric motor. When the torque sensed by the first torque sensing control system is higher than or equal to a threshold, the controller may control the first electric actuator to stop.

When the alignment unit is moved by the moving mechanism in a state in which the alignment rod of the alignment unit contacts the edge of the glass, the controller may determine whether the torque sensed by the first torque sensing control system of the first electric actuator is higher than or equal to the threshold. When the torque sensed by the first torque sensing control system of the first electric actuator is higher than or equal to the threshold, the controller may stop the first electric actuator to thereby prevent an overload from acting on the first electric actuator. Thus, wear or deformation of the alignment rod of the alignment unit may be minimized.

Each touch probe and the corresponding alignment unit may be attached together to the attachment of the moving mechanism. The touch probe and the corresponding alignment unit may be arranged side by side to cooperate with each other.

As the touch probe and the corresponding alignment unit are attached side by side to the attachment to cooperate with each other, the scanning operation of the scanning unit and the alignment operation of the alignment unit may be performed continuously and efficiently, and thus the glass may be quickly and accurately positioned on the setting base.

The alignment rod may have a diameter greater than that of the probe pin.

When the alignment rod is in the extended position and contacts the edge of the glass, the probe pin may avoid contacting the edge of the glass, and thus the probe pin may not interfere with the alignment operation of the alignment unit.

The automotive glass setting apparatus may further include: a plurality of posts mounted on a top surface of the setting base; and a plurality of vacuum cups mounted on the plurality of posts, respectively.

According to another aspect of the present disclosure, a method for setting a vehicle glass may include steps of loading a glass having a plurality of edges onto a setting base, scanning, by a scanning unit, the edges of the loaded glass, respectively, calculating a center of the glass based on data scanned by the scanning unit, and adjusting, by a plurality of alignment units and a plurality of moving mechanisms, a position of the glass so as to allow the calculated center of the glass to be aligned with a center of the setting base.

The method may further include preliminarily adjusting, by the plurality of alignment units and the plurality of moving mechanisms, a position of the loaded glass with respect to the setting base, before the scanning step.

The method may further include stopping each moving mechanism in the preliminarily adjusting step and the adjusting step. Each moving mechanism may include at least one electric actuator having an electric motor, and the electric actuator may include a torque sensing control system sensing and controlling a torque acting on the electric motor. The moving mechanism may be stopped when the torque sensed by the torque sensing control system of the electric actuator is higher than or equal to a threshold in a state in which the alignment units contact the edges of the glass.

The method may further include gripping, by a plurality of vacuum cups, the glass between the preliminary adjusting step and the scanning step. The plurality of vacuum cups may be mounted on the setting base, and as a vacuum pressure is provided to the plurality of vacuum cups, the plurality of vacuum cups may grip the glass.

The method may further include releasing the glass by releasing the vacuum pressure provided to the plurality of vacuum cups, between the calculating step and the adjusting step.

BRIEF DESCRIPTION OF THE FIGURES

The above and other objects, features and advantages of the present disclosure will be more apparent from the following detailed description taken in conjunction with the accompanying drawings.

DETAILED DESCRIPTION

Figure 1:
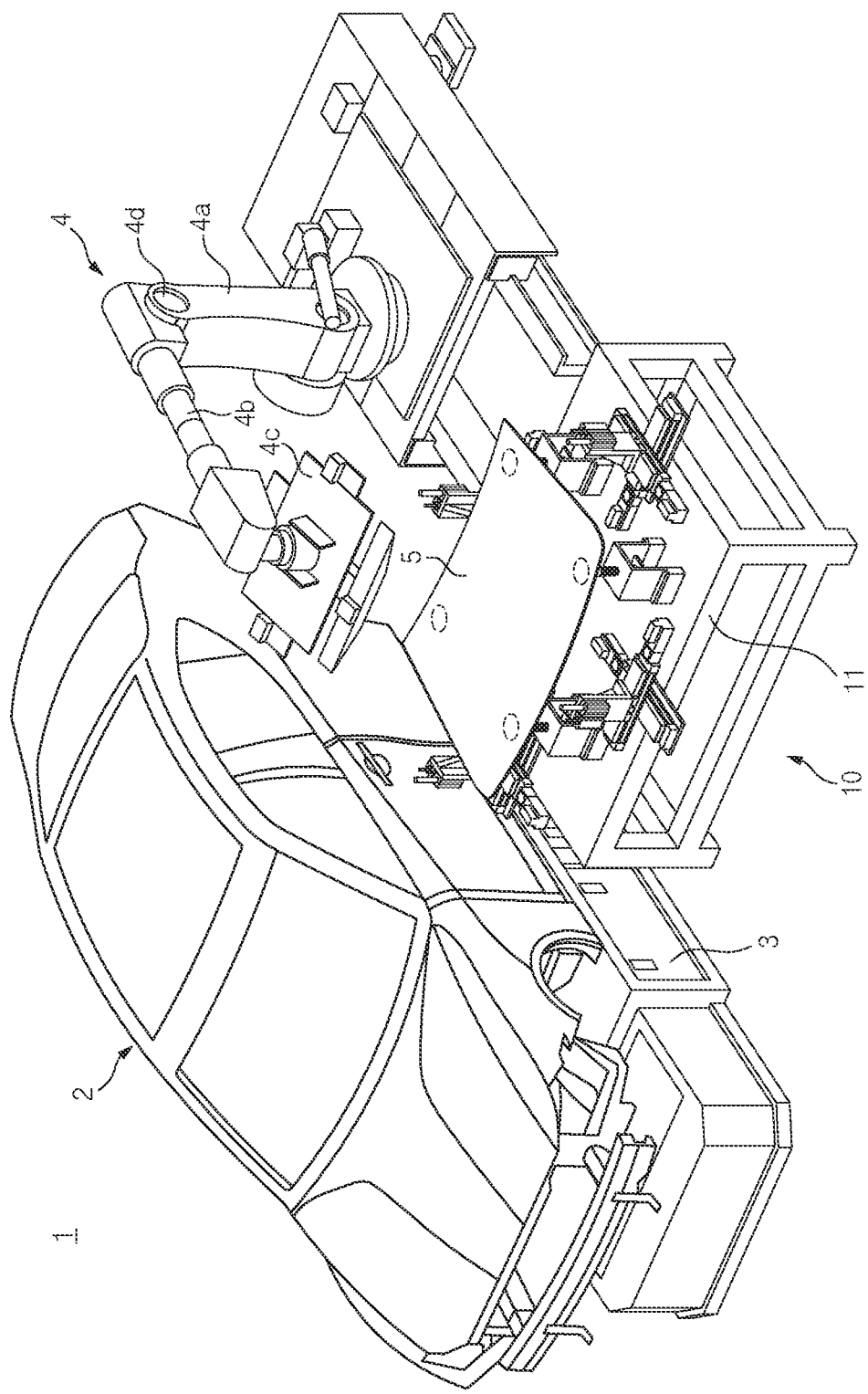
FIG. 1 illustrates a perspective view of an automotive glass setting apparatus according to an exemplary embodiment of the present disclosure, which is disposed adjacent to a vehicle glass mounting system.

Hereinafter, exemplary embodiments of the present disclosure will be described in detail with reference to the accompanying drawings. In the drawings, the same reference numerals will be used throughout to designate the same or equivalent elements. In addition, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, an automotive glass setting apparatus 10 according to an exemplary embodiment of the present disclosure may be disposed within a vehicle glass mounting system 1. The vehicle glass mounting system 1 may include a robot 4 for mounting a vehicle glass 5 in an opening of a vehicle body 2 supported to a platform 3. The robot 4 may include a base 4a, a robot arm 4b connected to the base 4a by an articulated joint 4d, and a gripper 4c attached to a free end of the robot arm 4b. The gripper 4c may grip and release the glass 5 which has been set by the automotive glass setting apparatus 10.

Figure 2:
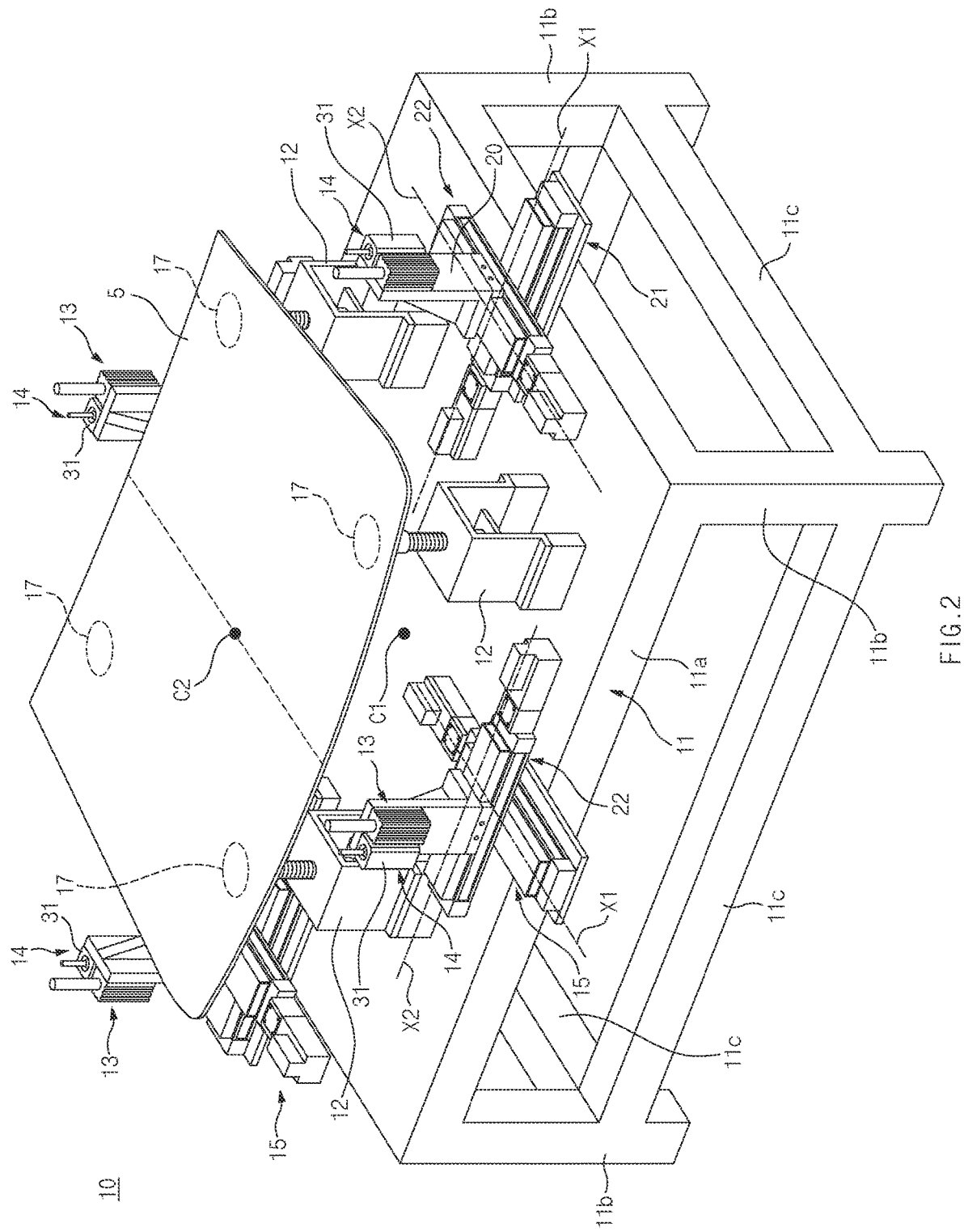
FIG. 2 illustrates a perspective view of an automotive glass setting apparatus according to an exemplary embodiment of the present disclosure, in a state in which a vehicle glass is loaded onto a setting base.
Figure 3:
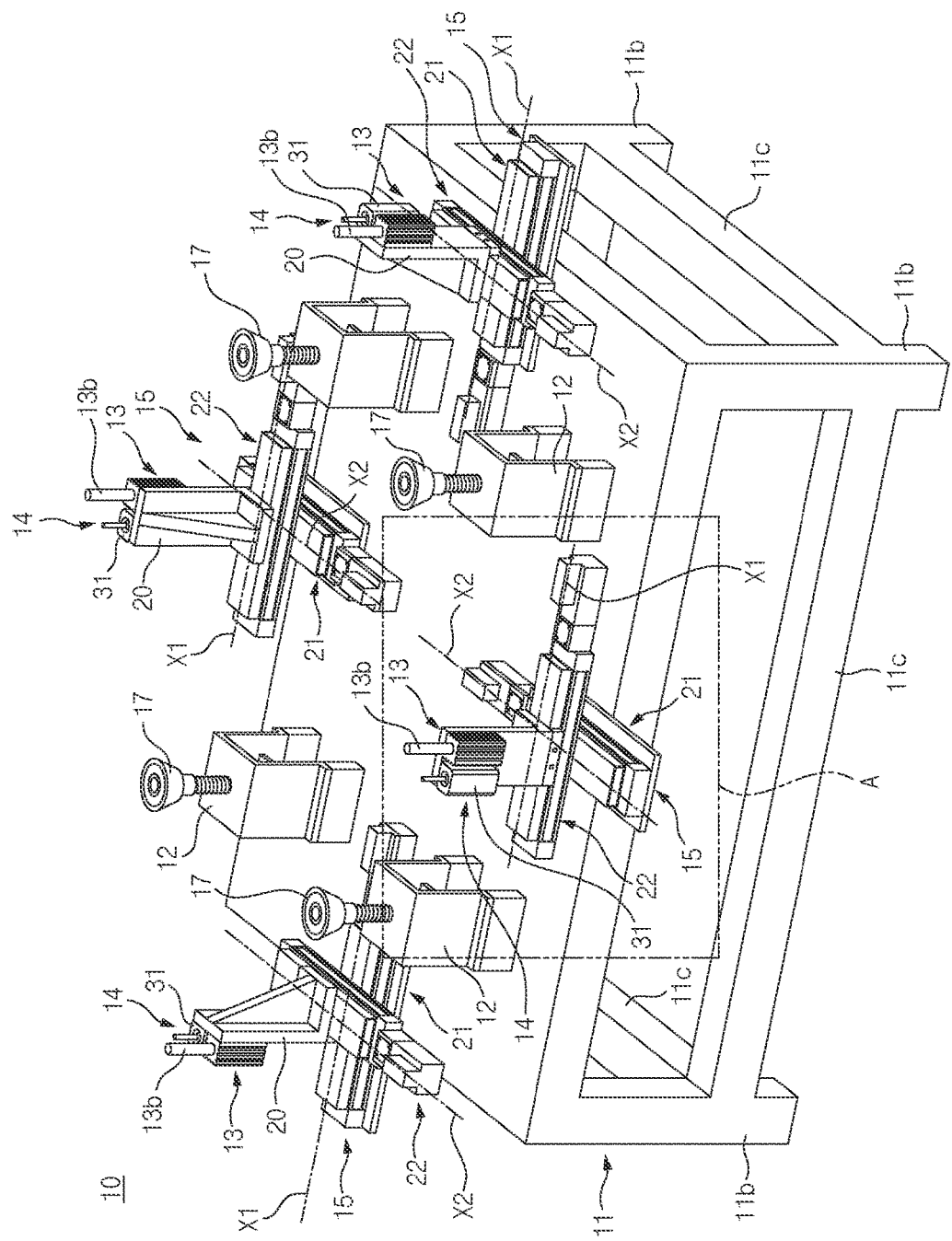
FIG. 3 illustrates a perspective view of an automotive glass setting apparatus according to an exemplary embodiment of the present disclosure, in a state before a vehicle glass is loaded onto a setting base.

Referring to FIGS. 2 and 3, the automotive glass setting apparatus 10 according to an exemplary embodiment of the present disclosure may include a setting base 11 supporting the glass 5 having a plurality of edges, a plurality of alignment units 13 allowing the glass 5 to be aligned with the setting base 11, a scanning unit 14 scanning the edges of the glass 5, a plurality of moving mechanisms 15 moving the plurality of alignment units 13, respectively, and a controller 16 controlling the operations of the moving mechanisms 15 based on data scanned by the scanning unit 14 so as to allow a center of the glass 5 to be aligned with a center of the setting base 11.

Referring to FIGS. 2 and 3, the setting base 11 may include a base plate 11a supporting the glass 5. The base plate 11a may have a flat top surface, and the base plate 11a may be a polygon having a plurality of edges, such as a rectangle. A plurality of legs 11b may extend vertically and downwardly from the base plate 11a, and the base plate 11a may be supported by the plurality of legs 11b at a predetermined height from a floor. A plurality of connection frames 11c may connect the plurality of legs 11b, and each connection frame 11c may extend horizontally.

The automotive glass setting apparatus 10 according to an exemplary embodiment of the present disclosure may further include a plurality of posts 12 mounted on the top surface of the setting base 11, and a plurality of vacuum cups 17 mounted on the plurality of posts 12, respectively.

The plurality of vacuum cups 17 may grip the glass 5 by a vacuum pressure. As a vacuum source 60 (see FIG. 10) provides the vacuum pressure to the vacuum cup 17, the plurality of vacuum cups 17 may grip the glass 5, and as the vacuum pressure is released from each vacuum cup 17, the plurality of vacuum cups 17 may release the glass 5. Since the plurality of vacuum cups 17 are able to selectively grip and release the glass 5, the scanning operation of the scanning unit 14 and the alignment operation of the alignment units 13 may be performed smoothly. When the scanning unit 14 scans the edges of the glass 5, the plurality of vacuum cups 17 may grip the glass 5 using the vacuum pressure so that scanning accuracy of the scanning unit 14 may be improved, and when the alignment units 13 align the glass 5, the plurality of vacuum cups 17 may release the glass 5 by releasing the vacuum pressure so that the degree of alignment of the glass 5 by the alignment units 13 may be improved.

Each of the plurality of alignment units 13 may be movably mounted on the base plate 11a of the setting base 11. The plurality of alignment units 13 may be disposed adjacent to the edges of the glass 5 supported by the setting base 11. As each alignment unit 13 is moved on the setting base 11 by the corresponding moving mechanism 15, the position of the glass 5 supported by the setting base 11 may be moved. In particular, as each moving mechanism 15 moves the corresponding alignment unit 13, the position of each edge of the glass 5 may be adjusted so that a center C2 of the glass 5 may be aligned with a center C1 of the setting base 11. That is, the plurality of alignment units 13 may be moved by the plurality of moving mechanisms 15, respectively, thereby allowing the glass 5 to be aligned with the setting base 11.

Figure 4:
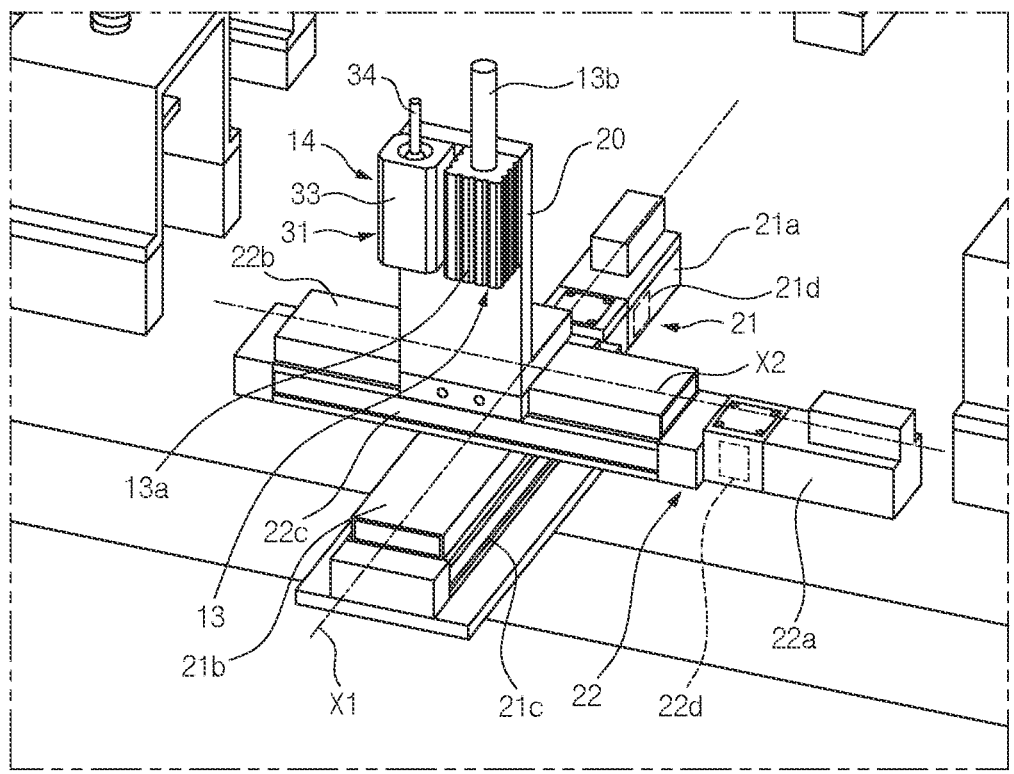
FIG. 4 illustrates an enlarged view of portion A of FIG. 3.
Figure 6:
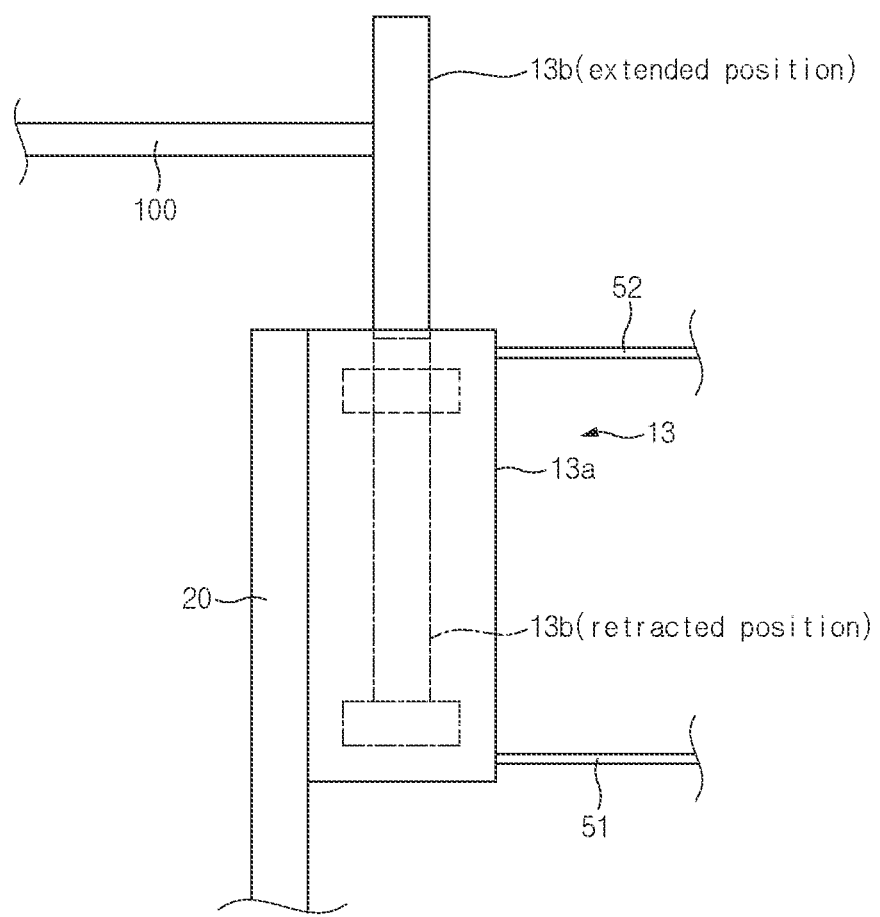
FIG. 6 illustrates a state in which an alignment rod of an alignment unit contacts an edge of a vehicle glass in an automotive glass setting apparatus according to an exemplary embodiment of the present disclosure.

Referring to FIG. 4, each alignment unit 13 may include a housing 13a, and an alignment rod 13b moving with respect to the housing 13a. According to an exemplary embodiment, the alignment unit 13 may be a fluid cylinder in which the alignment rod 13 moves vertically as a fluid (air, oil, etc.) is supplied and returned to the housing 13a. For example, when the air is supplied and returned to the housing 13a, the alignment unit 13 may be an air cylinder. When a liquid fluid such as oil is supplied and returned to the housing 13a, the alignment unit 13 may be a hydraulic cylinder. As the fluid is supplied and returned to the housing 13a of the alignment unit 13, the alignment rod 13b may move between an extended position (see solid line in FIG. 6, and FIG. 7) in which the alignment rod 13b protrudes from the housing 13a and a retracted position (see alternated long and short dash line in FIG. 6, and FIG. 8) in which the alignment rod 13b is received in the housing 13a. Referring to FIG. 6, a fluid supply line 51 and a fluid return line 52 may be connected to the housing 13a. As the fluid is supplied to the housing 13a through the fluid supply line 51, the alignment rod 13b may move to the extended position (see solid line in FIG. 6, and FIG. 7) in which the alignment rod 13b protrudes from the housing 13a. When the alignment rod 13b is in the extended position, the alignment rod 13b may directly come into contact with the edge of the glass 5. As the alignment unit 13 is moved by the moving mechanism 15, the alignment rod 13b may press the edge of the glass 5, and accordingly the glass 5 may move relative to the setting base 11. As the fluid is discharged from the housing 13a through the fluid return line 52, the alignment rod 13b may move to the retracted position (see alternated long and short dash line in FIG. 6, and FIG. 8) in which the alignment rod 13b is received in the housing 13a, and the alignment rod 13b may avoid contacting the edge of the glass 5.

The alignment rod 13b may move vertically in the housing 13a. In particular, when the alignment rod 13b is in the extended position, the alignment rod 13b may contact and press the edge of the glass 5 to move and align the glass 5, and when the alignment rod 13b is in the retracted position, the alignment rod 13b may not contact the edge of the glass 5, so it may not interfere with the scanning operation of a touch probe 31 to be described below. The alignment rod 13b may contact the edge of the glass 5 only during the alignment of the glass 5, so that the number of contacts between the alignment rod 13b and the glass 5 may be minimized, and thus wear of the alignment rod 13b may be minimized.

Figure 9:
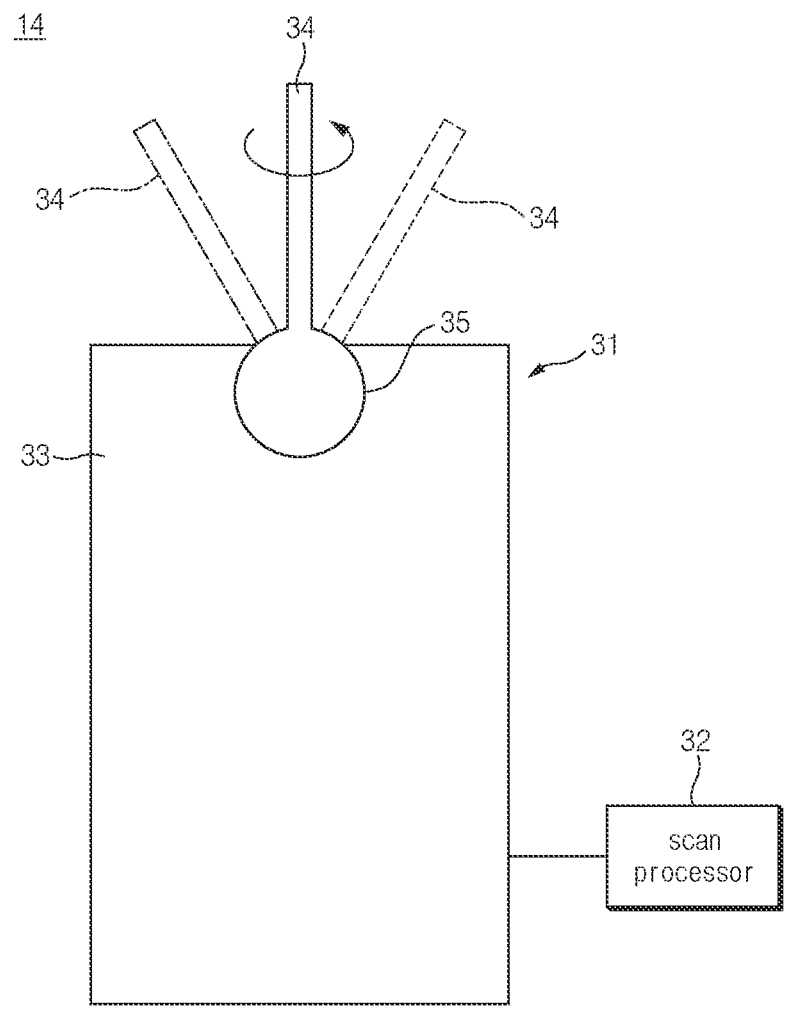
FIG. 9 illustrates a schematic view of a scanning unit in an automotive glass setting apparatus according to an exemplary embodiment of the present disclosure.

Referring to FIG. 9, the scanning unit 14 may include a plurality of touch probes 31 each scanning the edges of the glass 5, respectively, and a scan processor 32 processing data scanned by the plurality of touch probes 31.

The plurality of touch probes 31 may correspond to the plurality of alignment units 13, respectively. For example, the glass 5 may have four edges, and the setting base 11 may have four edges. The four alignment units 13 may be disposed on the edges of the setting base 11, respectively, and the four touch probes 31 may be disposed on the edges of the setting base 11, respectively. Each touch probe 31 and the corresponding alignment unit 13 may be arranged side by side to cooperate with each other. Thus, each moving mechanism 15 may move the touch probe 31 and the corresponding alignment unit 13.

Referring to FIGS. 2 to 5, each touch probe 31 may be disposed adjacent to the corresponding alignment unit 13. In particular, the touch probe 31 and the corresponding alignment unit 13 may be attached side by side to the corresponding moving mechanism 15. Thus, the touch probe 31 and the corresponding alignment unit 13 may be moved together by the corresponding moving mechanism 15. In particular, the touch probes 31 may be moved along the edges of the glass 5 by the moving mechanisms 15, respectively, and thus the plurality of touch probes 31 may scan the edges of the glass 5, respectively.

Referring to FIG. 9, the touch probe 31 may include a probe base 33, and a probe pin 34 movably connected to the probe base 33. Specifically, the probe pin 34 may be connected to the probe base 33 through a ball joint 35. The ball joint 35 may include a ball provided on a bottom end of the probe pin 34 and a ball socket provided in the probe base 33. The ball may be rotatably received in the ball socket. The probe pin 34 may pivot around the ball joint 35 or rotate on a longitudinal axis of the probe pin 34. As the probe pin 34 pivots or rotates on the probe base 33, the probe pin 34 may tightly contact the curved edge of the glass 5, thereby precisely scanning the edge of the glass 5.

As the plurality of touch probes 31 scan the respective edges of the glass 5, the scanning unit 14 may acquire the scanned data such as the outline, size, shape, and the like of the glass 5, and the controller 16 may control the plurality of moving mechanisms 15 based on the scanned data so that the plurality of alignment units 13 may allow the glass 5 to be aligned with the setting base 11. In particular, even when dimensional variations of the glass 5 occur, the controller 16 may control the plurality of moving mechanisms 15 based on the scanned data, thereby allowing the center of the glass 5 to be accurately aligned with the center of the setting base 11.

Figure 10:
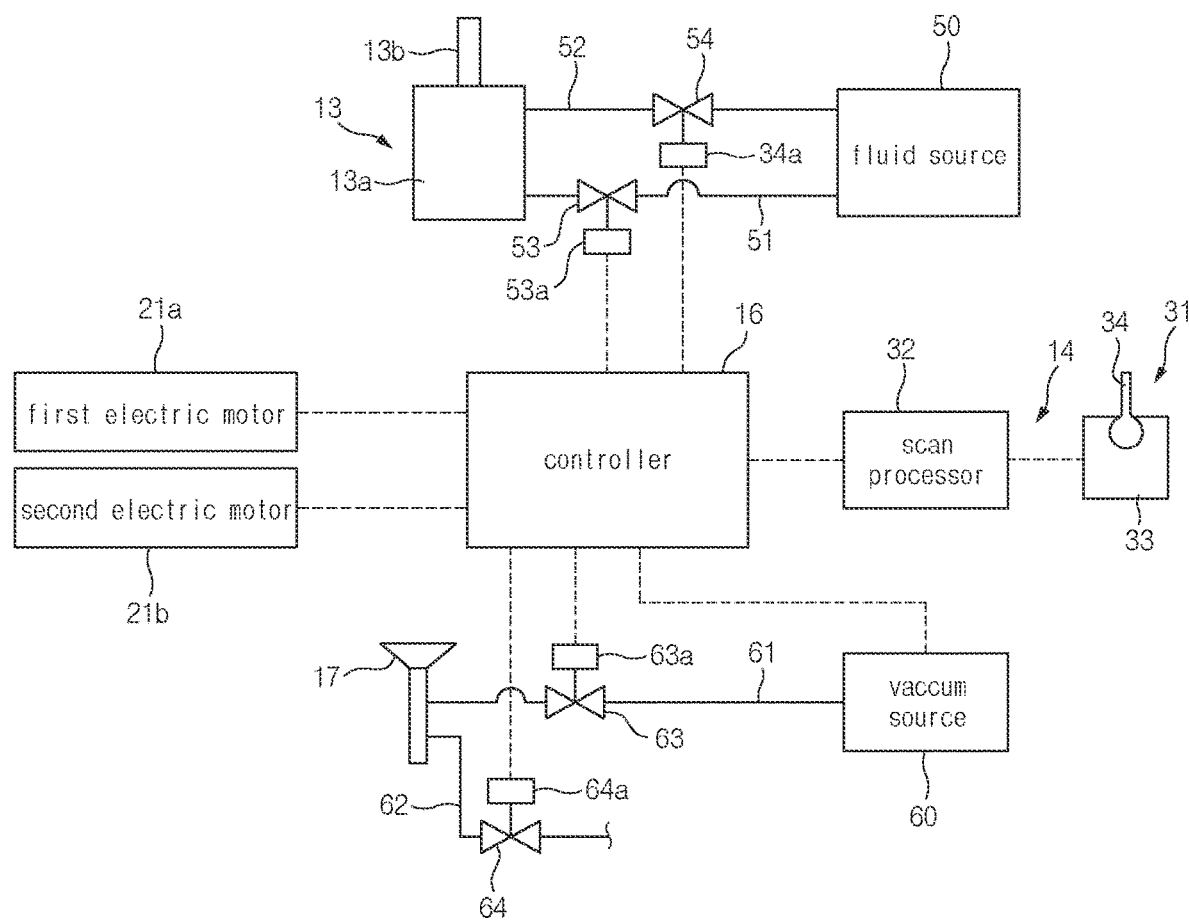
FIG. 10 illustrates a block diagram of the configuration of a controller and its related components of an automotive glass setting apparatus according to an exemplary embodiment of the present disclosure.

Referring to FIG. 10, the scan processor 32 may be electrically connected to the controller 16. The scan processor 32 may analyze and process the data (the outline, size, shape, and the like of the glass 5) scanned by the plurality of touch probes 31, and the data analyzed and processed by the scan processor 32 may be transmitted to the controller 16. For example, the scan processor 32 may be a piece of hardware independent of the controller 16 or may be a hardware module built in the controller 16. As another example, the scan processor 32 may be a software module stored in a memory of the controller 16.

According to an exemplary embodiment, the scan processor 32 may calculate the size and center of the glass 5 based on the data scanned by the plurality of touch probes 31.

According to another exemplary embodiment, the controller 16 may calculate the size and center of the glass 5 based on the data scanned by the plurality of touch probes 31 and processed by the scan processor 32.

The plurality of moving mechanisms 15 may be mounted on the edges of the setting base 11, respectively, and the plurality of moving mechanisms 15 may be disposed to correspond to the plurality of alignment units 13 and the plurality of touch probes 31. Thus, each moving mechanism 15 may be configured to move each alignment unit 13 and the corresponding touch probe 31. As each moving mechanism 15 moves the alignment unit 13 and the corresponding touch probe 31, the alignment unit 13 may move the edge of the glass 5, and the touch probe 31 may scan the edge of the glass 5.

According to an exemplary embodiment, each moving mechanism 15 may be configured to move the alignment unit 13 and the corresponding touch probe 31 on a two-dimensional coordinate system. The moving mechanism 15 may be configured to move the alignment unit 13 and the corresponding touch probe 31 along a first axis X1 and a second axis X2 of the two-dimensional coordinate system. The first axis X1 may be perpendicular to the second axis X2.

Referring to FIG. 4, each moving mechanism 15 may include an attachment 20, a first electric actuator 21 causing the attachment 20 to move along the first axis X1, and a second electric actuator 22 causing the attachment 20 to move along the second axis X2.

Referring to FIGS. 4, 5, 7, and 8, the alignment unit 13 and the corresponding touch probe 31 may be attached side by side to the attachment 20 using fasteners, welding, and/or the like. The first electric actuator 21 and the second electric actuator 22 may move the alignment unit 13 and the touch probe 31 attached to the attachment 20 along the first axis X1 and/or the second axis X2. Specifically, the alignment unit 13 and the corresponding touch probe 31 may be attached together to the attachment 20 of each moving mechanism 15, and the touch probe 31 and the corresponding alignment unit 13 may be arranged side by side. That is, the touch probe 31 and the corresponding alignment unit 13 may be attached side by side to the attachment 20 so that the touch probe 31 and the alignment unit 13 may be grouped with the attachment 20 of the moving mechanism 15.

As the touch probe 31 and the corresponding alignment unit 13 are attached side by side to the attachment 20 to cooperate with each other, the scanning operation of the scanning unit 14 and the alignment operation of the alignment unit 13 may be performed continuously and efficiently, and thus the glass 5 may be quickly and accurately positioned on the setting base 11.

The first axis X1 may be an axis extending toward the center C1 of the setting base 11. As the attachment 20 moves along the first axis X1, the alignment unit 13 may move toward the center C1 of the setting base 11 or move away from the center C1 of the setting base 11.

The second axis X2 may be an axis extending along the edge of the setting base 11. As the attachment 20 moves along the second axis X2, the alignment unit 13 may move along the edge of the setting base 11.

The first electric actuator 21 may include a first electric motor 21a, a first slider 21b moving along the first axis X1 by the first electric motor 21a, and a first guide 21c guiding the movement of the first slider 21b. The first electric actuator 21 may include a first torque sensing control system 21d sensing and controlling a torque of the first electric motor 21a.

As the first electric motor 21a of the first electric actuator 21 operates, the first slider 21b may move along the first axis X1. The second electric actuator 22 connected to the first slider 21b and the attachment 20 may move along the first axis X1, and the alignment unit 13 and the touch probe 31 attached to the attachment 20 may move along the first axis X1. In a state in which the alignment rod 13b of the alignment unit 13 is in the extended position, the alignment rod 13b may move the edge of the glass 5 toward the center of the setting base 11 or away from the center of the setting base 11. The alignment unit 13 may be moved toward the center C1 of the setting base 11 by the first electric actuator 21 (advance of the alignment unit 13), and the alignment unit 13 may be moved away from the center C1 of the setting base 11 by the first electric actuator 21 (reverse of the alignment unit 13).

Figure 7:
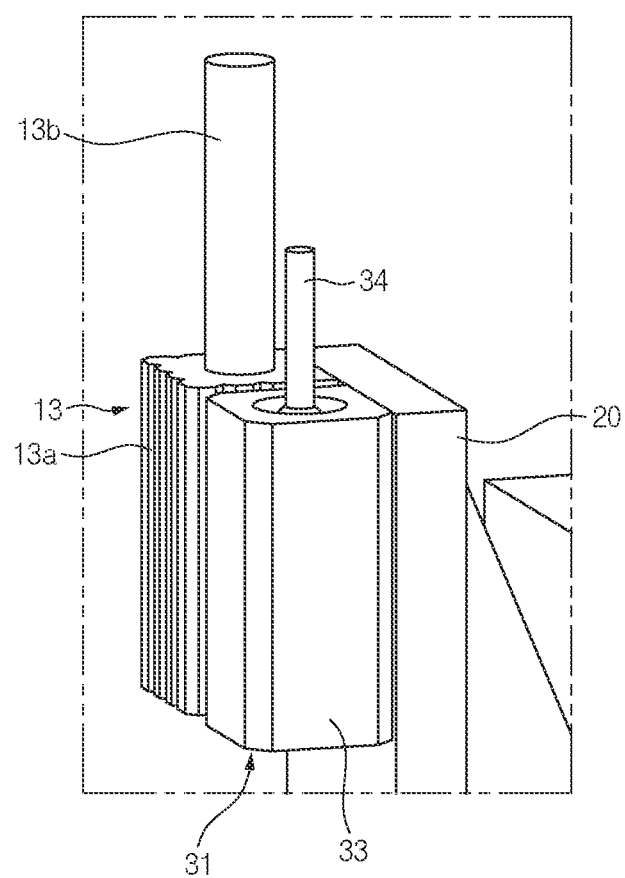
FIG. 7 illustrates an alignment unit and a touch probe attached side by side to an attachment of a moving mechanism in an automotive glass setting apparatus according to an exemplary embodiment of the present disclosure, in a state in which an alignment rod of the alignment unit is in an extended position.
Figure 8:
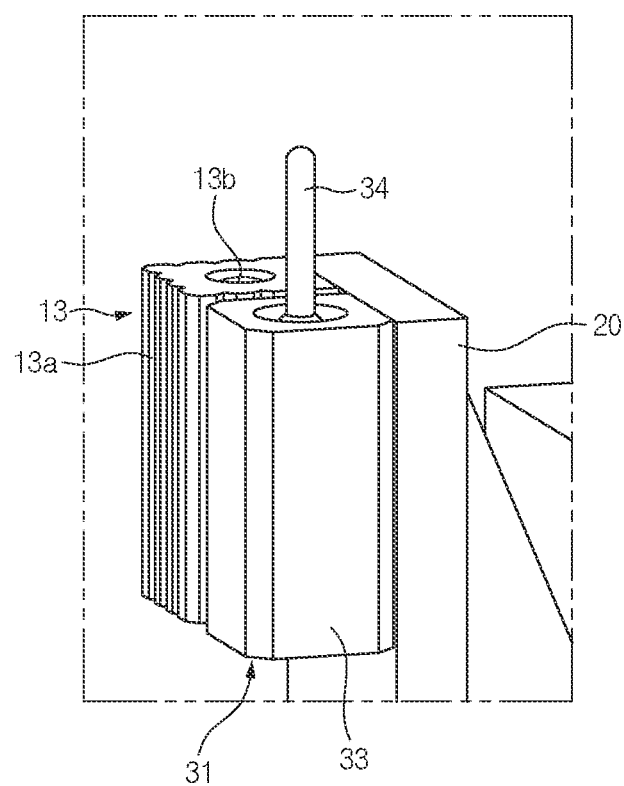
FIG. 8 illustrates an alignment unit and a touch probe attached side by side to an attachment of a moving mechanism in an automotive glass setting apparatus according to an exemplary embodiment of the present disclosure, in a state in which an alignment rod of the alignment unit is in a retracted position.
Figure 11:
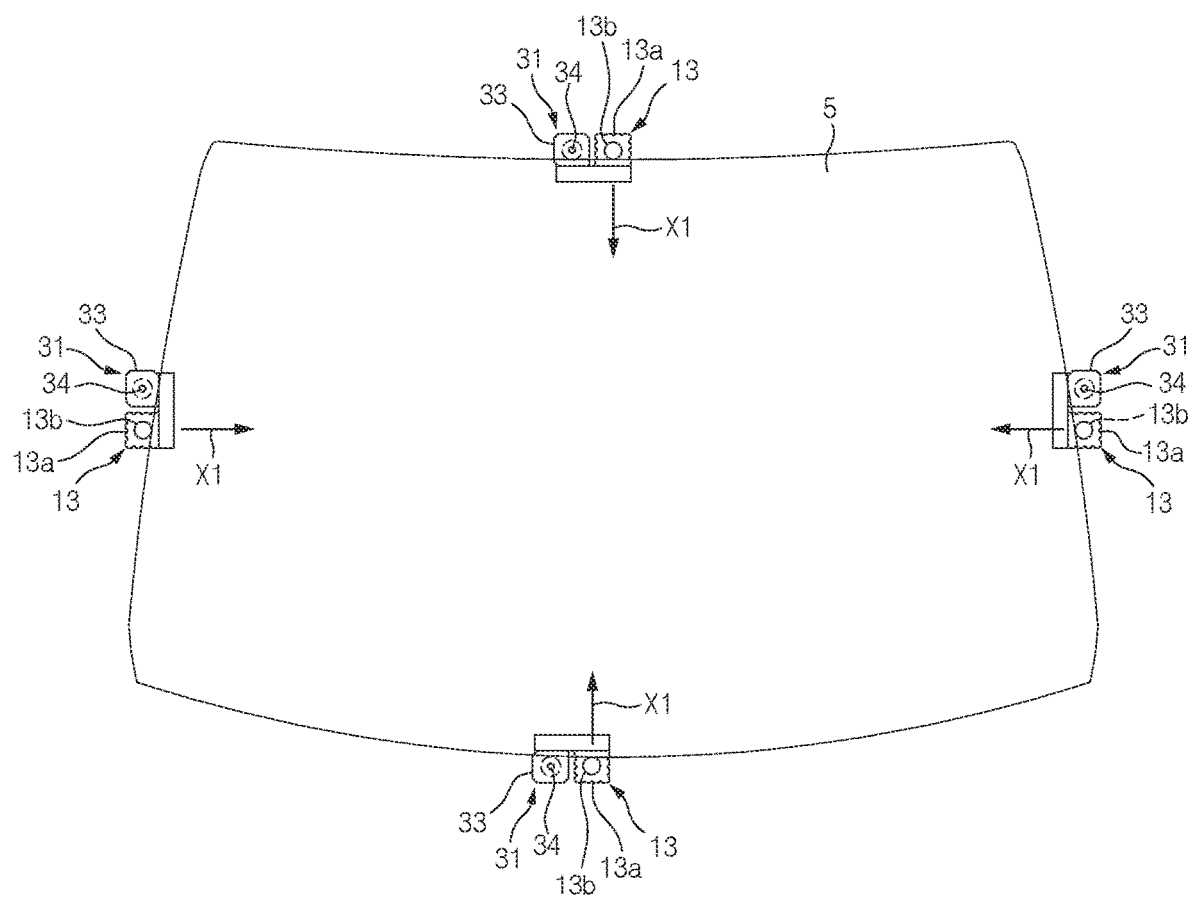
FIG. 11 illustrates a process of aligning a vehicle glass by a plurality of alignment units in an automotive glass setting apparatus according to an exemplary embodiment of the present disclosure.

When the plurality of alignment units 13 perform the alignment of the glass 5, the alignment rod 13b of each alignment unit 13 may be in the extended position (see solid line in FIG. 6, and FIG. 7). Referring to FIG. 11, as the first electric motor 21a of the first electric actuator 21 operates in a state in which the alignment rod 13b is in the extended position, the alignment rod 13b may move along the first axis X1, and accordingly the alignment rod 13b may contact and press the edge of the glass 5 so that the center C2 of the glass 5 may be aligned with the center C1 of the setting base 11. Here, the controller 16 may control the operation of the first electric motor 21a based on the data scanned by the scanning unit 14 so that the plurality of alignment units 13 may finely adjust the position of the glass 5 so as to allow the center C2 of the glass 5 to be aligned with the center C1 of the setting base 11.

Figure 5:
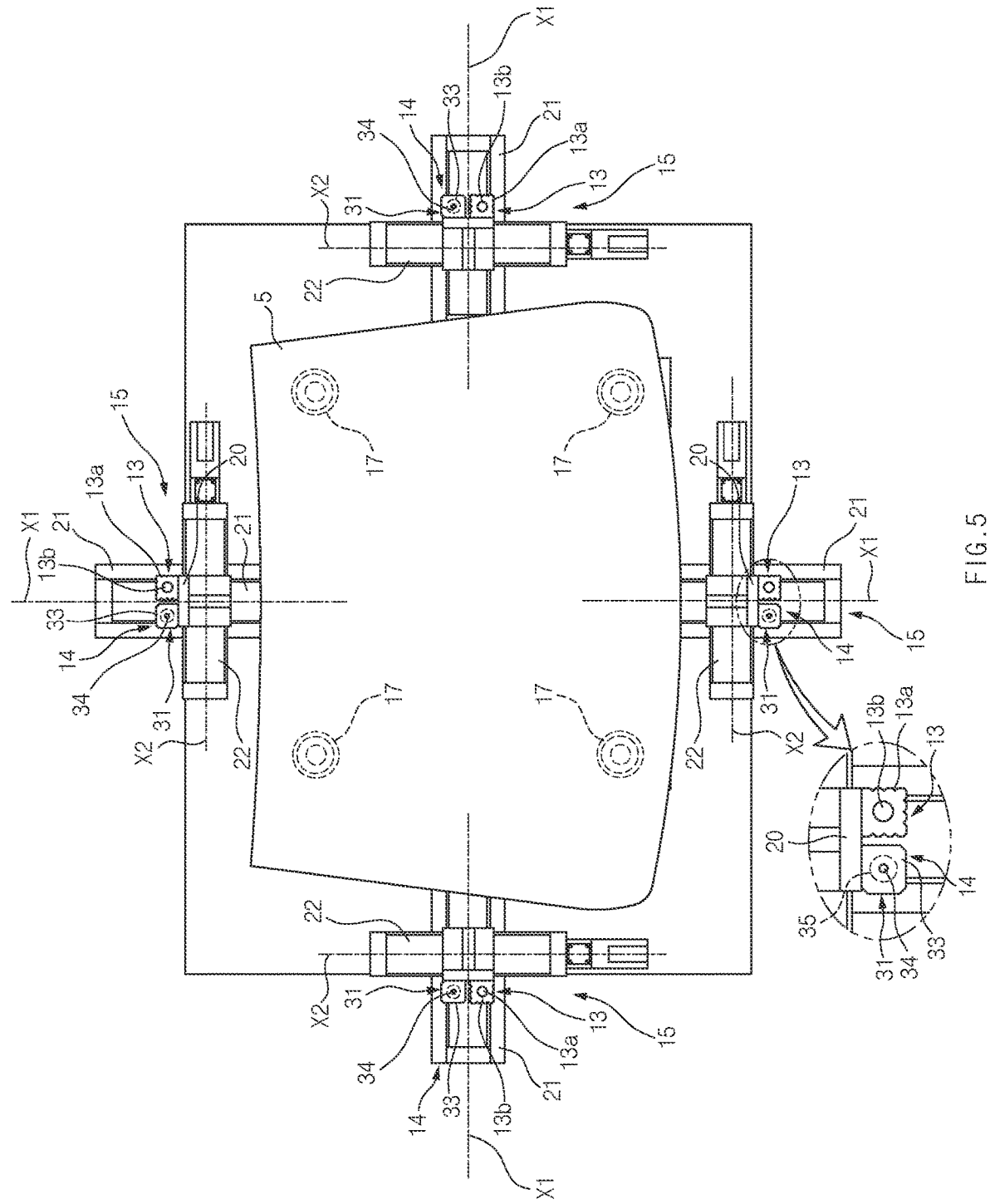
FIG. 5 illustrates a plan view of an automotive glass setting apparatus according to an exemplary embodiment of the present disclosure, in a state in which a vehicle glass is loaded onto a setting base.

Referring to FIGS. 4, 5, and 7, the alignment rod 13b of the alignment unit 13 may have a diameter greater than that of the probe pin 34 of the touch probe 31. When the alignment rod 13b contacts the edge of the glass 5 during the alignment operation of the alignment unit 13, the probe pin 34 may be prevented from contacting the edge of the glass 5, and thus the alignment operation of the alignment unit 13 may not be hindered by the probe pin 34.

The second electric actuator 22 may include a second electric motor 22a, a second slider 22b moving along the second axis X2 by the second electric motor 22a, and a second guide 22c guiding the movement of the second slider 22b. The second electric actuator 22 may include a second torque sensing control system 22d sensing and controlling a torque of the second electric motor 22a. The second guide 22c of the second electric actuator 22 may be fixed to the first slider 21b of the first electric actuator 21, and the attachment 20 may be fixed to the second electric actuator 22.

As the second electric motor 22a of the second electric actuator 22 operates, the second slider 22b may move along the edge of the setting base 11 along the second axis X2. The attachment 20 connected to the second slider 22b may move along the second axis X2, and the alignment unit 13 and the touch probe 31 attached side by side to the attachment 20 may move along the edge of the glass 5.

Figure 12:
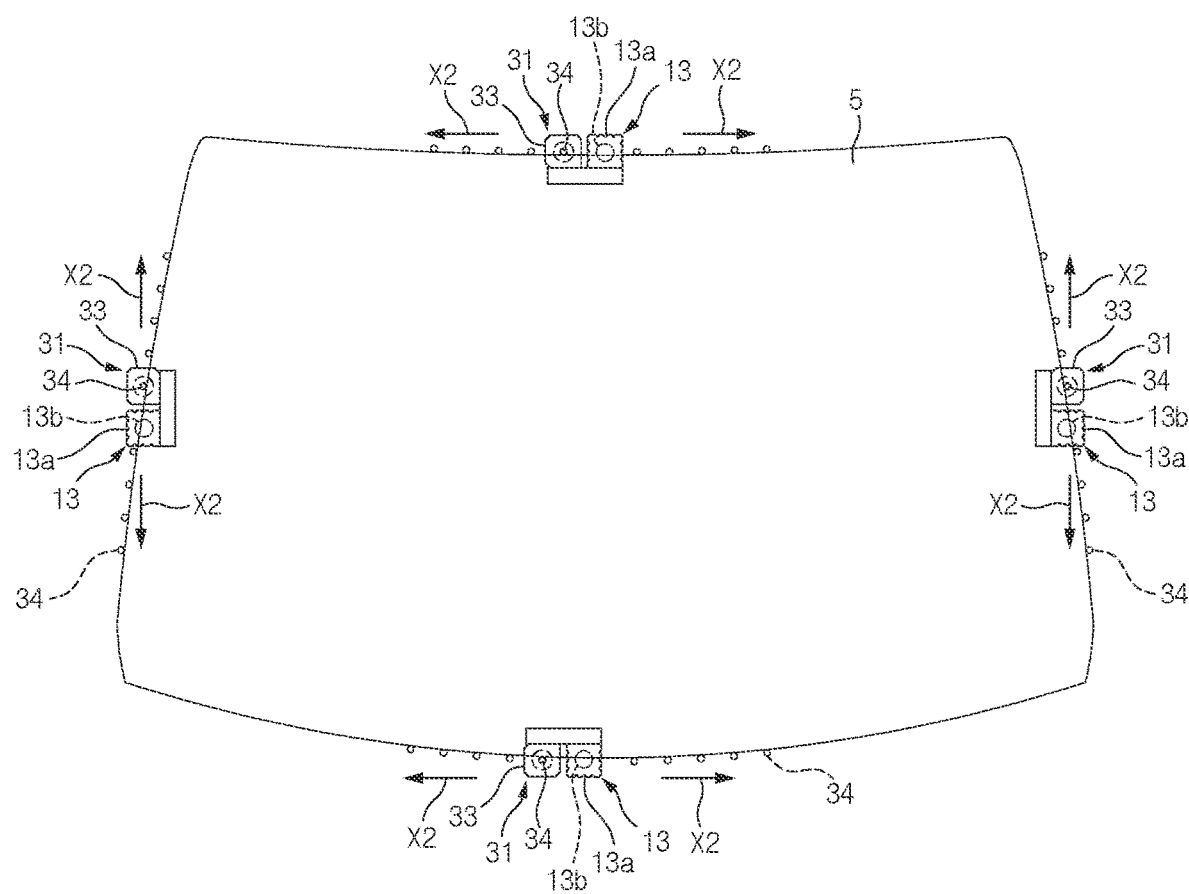
FIG. 12 illustrates a process of scanning edges of a vehicle glass by touch probes of a scanning unit in an automotive glass setting apparatus according to an exemplary embodiment of the present disclosure.

When the plurality of touch probes 31 scan the edges of the glass 5, respectively, the alignment rod 13b of each alignment unit 13 may be in the retracted position (see alternated long and short dash line in FIG. 6, and FIG. 8), and accordingly the alignment rod 13b may not directly contact the edge of the glass 5. The attachment 20 and the touch probe 31 may move along the first axis X1, and the probe pin 34 of the touch probe 31 may come into contact with the edge of the glass 5. Thereafter, as the second electric motor 22a of the second electric actuator 22 operates, the attachment 20 and the touch probe 31 may move along the second axis X2 as illustrated in FIG. 12, and accordingly the probe pin 34 of the touch probe 31 may scan the edge of the glass 5.

When the first electric motor 21a of the first electric actuator 21 operates and the alignment rod 13b of the alignment unit 13 comes into contact with the edge of the glass 5, the first torque sensing control system 21d may sense a torque acting on the first electric motor 21a so that the first torque sensing control system 21d may sense a torque acting between the alignment rod 13b and the edge of the glass 5. The torque acting between the alignment rod 13b and the edge of the glass 5 may be equal to a force acting along the first axis X1. The controller 16 may determine whether the torque sensed by the first torque sensing control system 21d is higher than or equal to a threshold. When the torque sensed by the first torque sensing control system 21d is higher than or equal to the threshold, the controller 16 or a motor controller (not shown) provided in the first electric actuator 21 may control the first electric actuator 21 to stop. When each alignment unit 13 is moved by the corresponding moving mechanism 15 in a state in which the alignment rod 13b of the alignment unit 13 contacts the edge of the glass 5, the controller 16 may determine whether the torque sensed by the first torque sensing control system 21d of the first electric actuator 21 is higher than or equal to the threshold. As the alignment rod 13b of the alignment unit 13 contacts and presses the edge of the glass 5, an overload may act on the alignment rod 13b and the first electric actuator 21. The threshold may be a reference torque for determining whether the overload acts on the alignment rod 13b and the first electric actuator 21. When the torque sensed by the first torque sensing control system 21d of the first electric actuator 21 is higher than or equal to the threshold, the controller 16 may determine that the overload acts on the alignment rod 13b and the first electric actuator 21, and thus the controller 16 may stop the first electric actuator 21 to thereby prevent the overload from acting on the alignment rod 13b and the first electric actuator 21. As a result, wear or deformation of the alignment rod 13b of the alignment unit 13 may be minimized, and a failure of the first electric actuator 21 may be prevented.

Referring to FIG. 10, the controller 16 may be electrically connected to the first electric motor 21a of the first electric actuator 21 and the second electric motor 22a of the second electric actuator 22. Thus, the controller 16 may individually control the operation of the first electric actuator 21 and the operation of the second electric actuator 22.

Referring to FIG. 10, the housing 13a of the alignment unit 13 may be fluidly connected to a fluid source 50 through the fluid supply line 51 and the fluid return line 52. A fluid supply valve 53 may be disposed on the fluid supply line 51, and the fluid supply valve 53 may be opened and closed by a motor 53a. A fluid return valve 54 may be disposed on the fluid return line 52, and the fluid return valve 54 may be opened and closed by a motor 54a. The controller 16 may be electrically connected to the motor 53a of the fluid supply valve 53 and the motor 54a of the fluid return valve 54, and the controller 16 may control the motor 53a of the fluid supply valve 53 and the motor 54a of the fluid return valve 54, thereby adjusting the movement of the alignment rod 13b. That is, the controller 16 may control the movement of the alignment rod 13b of the alignment unit 13.

Referring to FIG. 10, each vacuum cup 17 may be connected to a vacuum source 60 through a vacuum line 61, and the vacuum source 60 may be a vacuum pump or the like. A vacuum supply valve 63 may be disposed on the vacuum line 61, and the vacuum supply valve 63 may be opened and closed by a motor 63a. A vacuum release line 62 may be connected to the vacuum cup 17. A vacuum release valve 64 may be disposed on the vacuum release line 62, and the vacuum release valve 64 may be opened and closed by a motor 64a. The controller 16 may be electrically connected to the motor 63a of the vacuum supply valve 63 and the vacuum source 60, and the controller 16 may control the motor 63a of the vacuum supply valve 63 and the vacuum source 60 so that vacuum may be provided to the vacuum cup 17. The controller 16 may be electrically connected to the motor 64a of the vacuum release valve 64, and the controller 16 may control the motor 64a of the vacuum release valve 64, thereby controlling the release of vacuum from the vacuum cup 17.

Figure 13:
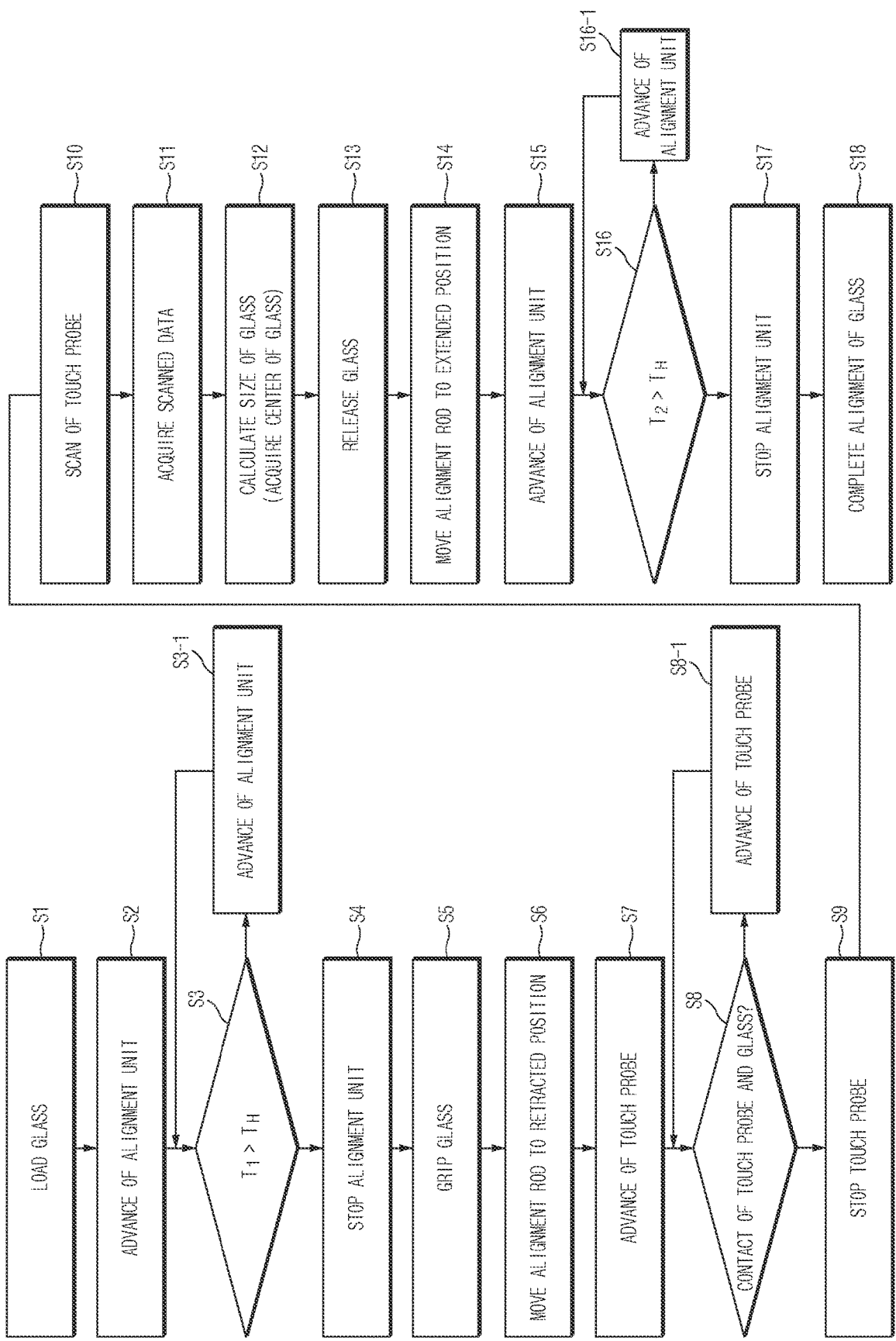
FIG. 13 illustrates a flowchart of a method for setting a vehicle glass by an automotive glass setting apparatus according to an exemplary embodiment of the present disclosure.

FIG. 13 illustrates a flowchart of a method for setting a vehicle glass using an automotive glass setting apparatus according to an exemplary embodiment of the present disclosure.

First of all, the glass 5 may be loaded onto the setting base 11 by an operator or a loading robot at S1. Accordingly, the glass 5 may be placed on the vacuum cups 17 of the setting base 11.

When the loading of the glass 5 onto the setting base 11 is sensed by a sensor (not shown) and/or the controller 16, the fluid supply valve 53 of the fluid supply line 51 may be opened so that a fluid may be supplied to the housing 13a of each alignment unit 13, and thus the alignment rod 13b of each alignment unit 13 may move to the extended position. As the first electric motor 21a of the first electric actuator 21 of each moving mechanism 15 operates, each alignment unit 13 may advance toward each edge of the glass 5 at S2. As the alignment rods 13b of the alignment units 13 contact and press the respective edges of the glass 5, the position of the glass 5 may be preliminarily adjusted with respect to the setting base 11.

It may be preliminarily determined whether a first torque T1 sensed by the first torque sensing control system 21d of the first electric actuator 21 is higher than or equal to a threshold $T_H$ in a state in which the alignment rod 13b of each alignment unit 13 contacts each edge of the glass 5 at S3.

When it is determined in S3 that the sensed torque T1 is less than the threshold $T_H$, the first electric motor 21a of the first electric actuator 21 may keep operating so that the alignment unit 13 may continuously advance at S3-1.

When it is determined in S3 that the sensed torque T1 is higher than or equal to the threshold $T_H$, the first electric motor 21a of the first electric actuator 21 may be stopped so that the alignment unit 13 may be stopped at S4.

After the alignment unit 13 is stopped, the vacuum source 60 may provide a vacuum pressure to the plurality of vacuum cups 17 in a state in which the vacuum supply valve 63 is opened, and thus the plurality of vacuum cups 17 may grip the glass 5 using the vacuum pressure at S5.

After the glass 5 is gripped by the plurality of vacuum cups 17, the fluid return valve 54 may be opened and the fluid may be returned from the housing 13a of each alignment unit 13, and thus the alignment rod 13b of each alignment unit 13 may move to the retracted position at S6. As each alignment rod 13b moves to the retracted position in which the alignment rod 13b is received in the housing 13a, the alignment rod 13b may not contact the edge of the glass 5.

As the first electric motor 21a of the first electric actuator 21 of each moving mechanism 15 operates after the alignment rod 13b moves to the retracted position, each touch probe 31 of the scanning unit 14 may advance toward each edge of the glass 5 at S7.

The controller 16 may determine whether each touch probe 31 contacts each edge of the glass 5 through a touch sensing circuit or a contact sensor (not shown) at S8.

When it is determined in S8 that the touch probe 31 does not contact the edge of the glass 5, the first electric motor 21a may keep operating so that the touch probe 31 may continuously advance at S8-1)\.

When it is determined in S8 that the touch probe 31 contacts the edge of the glass 5, the first electric motor 21a may be stopped so that the advance of the touch probe 31 may be stopped at S9.

As the second electric motor 22a of the second electric actuator 22 operates, each touch probe 31 may move along the second axis X2. As the touch probe 31 moves along the edge of the glass 5, the touch probe 31 may scan the edge of the glass 5 at S10.

The scan processor 32 of the scanning unit 14 may acquire data scanned by the plurality of touch probes 31 at S11.

The scan processor 32 or the controller 16 may calculate the size of the glass 5 and the center C2 of the glass 5 based on the scanned data at S12. According to an exemplary embodiment, the scan processor 32 may calculate the size of the glass 5 and the center C2 of the glass 5 based on the scanned data, and the calculated result may be transmitted to the controller 16. According to another exemplary embodiment, the controller 16 may calculate the size of the glass 5 and the center C2 of the glass 5 based on data processed and analyzed by the scan processor 32.

After the center C2 of the glass 5 is calculated, the vacuum release valve 64 may be opened so that the vacuum pressure provided to the plurality of vacuum cups 17 may be released or vented through the vacuum release line 62, and thus the plurality of vacuum cups 17 may release the glass 5 at S13.

After the glass 5 is released, the fluid supply valve 53 of the fluid supply line 51 may be opened so that the fluid may be provided to the housing 13a of each alignment unit 13, and thus the alignment rod 13b of each alignment unit 13 may move to the extended position at S14. The controller 16 may control the operation of the first electric motor 21a so that the calculated center C2 of the glass 5 may be aligned with the center C1 of the setting base 11, and thus each alignment unit 13 may advance toward each edge of the glass 5 at S15. As the alignment rods 13b of the alignment units 13 contact and press the respective edges of the glass 5, the position of the glass 5 on the setting base 11 may be secondarily adjusted, and thus the center C2 of the glass 5 may be aligned with the center C1 of the setting base 11.

It may be secondarily determined whether a second torque T2 sensed by the first torque sensing control system 21d of the first electric actuator 21 is higher than or equal to the threshold $T_H$ (S16).

When it is determined in S16 that the sensed torque T2 is less than the threshold $T_H$, the first electric motor 21a of the first electric actuator 21 may keep operating so that the alignment unit 13 may continuously advance at S16-1.

When it is determined in S16 that the sensed torque T2 is higher than or equal to the threshold $T_H$, the first electric motor 21a of the first electric actuator 21 may be stopped so that the alignment unit 13 may be stopped at S17. Thus, the center C2 of the glass 5 may be aligned with the center C1 of the setting base 11, and the alignment of the glass 5 may be completed at S18.

According to the above-described exemplary embodiment of the present disclosure, the movement of the alignment units 13 may be adjusted by the moving mechanisms 15 based on the data scanned by the scanning unit 14 so that the center of the glass 5 may be aligned with the center of the setting base 11, and thus the glass 5 may be accurately positioned on the setting base 11. Since the glass 5 is accurately positioned on the setting base 11, the gripper 4c of the robot 4 may accurately grip the glass 5, and thus the robot 4 may accurately mount the glass 5 in the opening of the vehicle body.

As set forth above, according to exemplary embodiments of the present disclosure, by scanning the edges of the glass and controlling the plurality of moving mechanisms based on the scanned data even when the dimensional variation of the glass occurs, the center of the glass may be accurately aligned with the center of the setting base. As the gripper of the robot accurately grips the glass, the robot may accurately mount the glass in the opening of the vehicle body.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

The invention claimed is:

1. An automotive glass setting apparatus, comprising:
   a setting base configured to support a glass having a plurality of edges;
   a plurality of alignment units configured to align the glass with the setting base;
   a scanning unit configured to scan the edges of the glass;
   a plurality of moving mechanisms configured to move the plurality of alignment units; and
   a controller configured to control the plurality of moving mechanisms based on data scanned by the scanning unit to align a center of the glass with a center of the setting base.

2. The automotive glass setting apparatus according to claim 1, wherein each of the plurality of alignment units is movably mounted on a corresponding edge of the plurality of edges of the setting base by a corresponding moving mechanism.

3. The automotive glass setting apparatus according to claim 1, wherein each of the plurality of alignment units includes:
   a housing; and
   an alignment rod configured to move with respect to the housing.

4. The automotive glass setting apparatus according to claim 3, wherein, as a fluid is supplied and returned to the housing, the alignment rod moves between an extended position in which the alignment rod protrudes from the housing, and a retracted position in which the alignment rod is received in the housing.

5. The automotive glass setting apparatus according to claim 1, wherein the scanning unit includes:
   a plurality of touch probes configured to scan the plurality of edges of the glass; and
   a scan processor configured to process data scanned by the plurality of touch probes.

6. The automotive glass setting apparatus according to claim 5, wherein the plurality of touch probes are moved along the plurality of edges of the glass by the moving mechanisms, so that the plurality of touch probes scan the edges of the glass.

7. The automotive glass setting apparatus according to claim 6, wherein each touch probe includes:
   a probe base; and
   a probe pin movably connected to the probe base.

8. The automotive glass setting apparatus according to claim 7, wherein the probe pin is connected to the probe base via a ball joint.

9. The automotive glass setting apparatus according to claim 8, wherein each touch probe and a corresponding alignment unit are attached side by side to a corresponding moving mechanism so that the touch probe and the corresponding alignment unit are moved together by the corresponding moving mechanism.

10. The automotive glass setting apparatus according to claim 1, wherein each moving mechanism includes:
    an attachment;
    a first electric actuator configured to move the attachment along a first axis; and
    a second electric actuator configured to move the attachment along a second axis;
    wherein the first axis extends toward the center of the setting base; and
    wherein the second axis extends along an edge of the setting base.

11. The automotive glass setting apparatus according to claim 10, wherein the first electric actuator includes:
    a first electric motor;
    a first slider configured to move along the first axis by the first electric motor; and
    a first guide guiding a movement of the first slider.

12. The automotive glass setting apparatus according to claim 11, wherein the second electric actuator includes:
    a second electric motor;
    a second slider configured to move along the second axis by the second electric motor; and
    a second guide configured to guide a movement of the second slider.

13. The automotive glass setting apparatus according to claim 12, wherein the second guide of the second electric actuator is fixed to the first slider of the first electric actuator, and the attachment is fixed to the second electric actuator.

14. The automotive glass setting apparatus according to claim 10, wherein the first electric actuator includes a first torque sensing control system configured to sense and control a torque of the first electric motor; and
    when the torque sensed by the first torque sensing control system is higher than or equal to a threshold, the controller stops the first electric actuator.

15. The automotive glass setting apparatus according to claim 1, further comprising:
    a plurality of posts mounted on a top surface of the setting base; and
    a plurality of vacuum cups mounted on the plurality of posts.

\* \* \* \* \*